US008187688B2

(12) United States Patent
MacWilliams

(10) Patent No.: US 8,187,688 B2
(45) Date of Patent: May 29, 2012

(54) FOLDABLE LABELS

(75) Inventor: Steve MacWilliams, Fullerton, CA (US)

(73) Assignee: Macpac Associates, Fullerton, CA (US)

( * ) Notice: Subject to any disclaimer, the term of this patent is extended or adjusted under 35 U.S.C. 154(b) by 396 days.

(21) Appl. No.: 12/437,446

(22) Filed: May 7, 2009

(65) Prior Publication Data

US 2010/0227086 A1 Sep. 9, 2010

Related U.S. Application Data

(60) Provisional application No. 61/158,545, filed on Mar. 9, 2009.

(51) Int. Cl.
*B32B 9/00* (2006.01)
*B32B 3/30* (2006.01)
*B32B 7/14* (2006.01)
*B41M 5/00* (2006.01)

(52) U.S. Cl. .................. 428/40.1; 428/32.1; 428/32.22; 428/156; 428/167; 428/195.1; 428/201; 428/202

(58) Field of Classification Search ................. 428/40.1, 428/42.1, 42.2, 42.3, 43, 32.1, 32.22, 88, 428/156, 167, 195.1, 201, 202
See application file for complete search history.

(56) References Cited

U.S. PATENT DOCUMENTS

| | | | | |
|---|---|---|---|---|
| 4,004,362 | A * | 1/1977 | Barbieri | 40/316 |
| 4,050,719 | A | 9/1977 | Cunningham | |
| RE29,422 | E | 10/1977 | Cunningham | |
| 4,445,711 | A | 5/1984 | Cunningham | |
| 4,520,055 | A * | 5/1985 | Jeter | 428/55 |
| 5,379,538 | A * | 1/1995 | Osborne | 40/638 |
| 6,248,414 | B1 * | 6/2001 | Donahue | 428/41.8 |

* cited by examiner

*Primary Examiner* — Patricia Nordmeyer
(74) *Attorney, Agent, or Firm* — Knobbe, Martens, Olson & Bear, LLP

(57) ABSTRACT

According to certain embodiments disclosed in the present application, an adhesive label configured to be fed into a printer includes a main layer having a first side configured to be printed and a second side and a liner configured to releasably attach to the second surface of the main layer. The second surface of the main layer comprises one or more creases configured to facilitate folding of the label in a desired manner. In some embodiments, the crease enables folding of the label along a longitudinal centerline. In one embodiment, the crease does not extend across an entire width of the label. In other arrangements, the main layer comprises an intermediate layer and a printable layer secured to the intermediate layer.

14 Claims, 11 Drawing Sheets

FOLDABLE LABELS

CROSS REFERENCE TO RELATED APPLICATIONS

This application claims the priority benefit under 35 U.S.C. §119(e) of U.S. Provisional Application No. 61/158,545 filed Mar. 9, 2009, the entirety of which is hereby incorporated by reference herein.

BACKGROUND

1. Field of the Inventions

This application relates generally to labels, and more specifically, to foldable labels configured to be affixed on folders, containers or other items.

2. Description of the Related Art

The use of labels on folders, packages, containers and other items that require identifying data and other information is well-known. Such labels can be self-adhesive, enabling users to easily affix them to a desired item. In addition, sheets or rolls of such labels can be fed through printers, plotters or other printing device to selectively provide the desired or required information thereon. Further, many labels are of the “lay flat” or “stay flat” type that are not configured to be folded, bent or otherwise manipulated. Accordingly, a need for an improved adhesive label exists.

SUMMARY

According to certain embodiments disclosed in the present application, an adhesive label configured to be fed into a printer includes a main layer having a first side configured to be printed and a second side and a liner configured to releasably attach to the second surface of the main layer. The second surface of the main layer comprises one or more creases configured to facilitate folding of the label in a desired manner. In some embodiments, the crease enables folding of the label along a longitudinal centerline. In one embodiment, the crease does not extend across an entire width of the label. In other arrangements, the main layer comprises an intermediate layer and a printable layer secured to the intermediate layer.

According to some embodiments, the intermediate layer includes one or more creases. In another arrangement, the liner is configured to releasably attach to the intermediate layer. In other embodiments, the crease comprises a gap in the intermediate layer. In alternative embodiments, the crease comprises one or more gaps, cuts, perforations, scoring, other undermining and/or the like in the main layer. In one arrangement, the liner comprises a waxed paper, a quick release paper, a coating and/or the like. In other arrangements, the label further comprises an adhesive between the main layer and the liner.

In accordance with some arrangements, an adhesive label configured to be fed into a printer includes an upper layer having a top surface and a bottom surface with the top surface of the upper layer configured be selectively printed. The label further includes a liner, an intermediate layer generally positioned between the upper layer and the liner, a first adhesive placed between the liner and the intermediate layer and a second adhesive placed between the upper layer and the intermediate layer to secure the printable layer to the intermediate layer. According to some embodiments, the liner is configured to releasably attach to the intermediate layer.

In one embodiment, the label comprises a first end and a second end with the second end being generally opposite said first end. A first distance extends from the first end to the second end and separates the first and second ends. In some arrangements, a longitudinal axis extends through the label from the first end to the second end. In one embodiment, the intermediate layer comprises at least one folding crease configured to facilitate folding of the label in a desired manner. In some embodiments, the folding crease includes a total length that equals a second distance, such that the first distance is greater than the second distance. In some arrangements, the crease comprises a gap, a cut, a perforation or a scoring and/or the like. In another embodiment, the liner includes waxed paper, a coating, quick release paper and/or the like.

According to certain embodiments, a label roll which comprises a plurality of adhesive labels and which is adapted to be fed into a printer includes a printable layer having a top surface and a bottom surface. The top surface of the printable layer is configured be selectively printed. The roll additionally comprises a liner, an intermediate layer generally positioned between the upper layer and the liner, at least a first adhesive placed between the liner and the intermediate layer and at least a second adhesive placed between the printable layer and the intermediate layer to secure the printable layer to the intermediate layer.

In some embodiments, liner is configured to releasably attach to the intermediate layer. In other arrangements, each label comprises a first end and a second end, with the second end being generally opposite said first end and a first distance generally separating the first end and the second end. In certain embodiments, a longitudinal axis extends through each label from the first end to the second end. In some arrangements, the intermediate layer comprises at least one folding crease configured to facilitate folding of each label in a desired manner, a total length of the folding crease having a second distance. In some embodiments, the first distance is greater than the second distance.

BRIEF DESCRIPTION OF THE DRAWINGS

These and other features, aspects and advantages of the present inventions are described with reference to drawings of certain preferred embodiments, which are intended to illustrate, but not to limit, the present invention. The drawings include twenty-one (21) figures. It is to be understood that the attached drawings are for the purpose of illustrating concepts of the present invention and may not be to scale.

DETAILED DESCRIPTION OF THE PREFERRED EMBODIMENTS

This application discloses various embodiments of printable labels that are configured to be folded along one or more creases. In some embodiments, such labels are adapted to be affixed on folders, boxes, parcels, other containers and/or the like. However, such labels, the methods of making same and/or other features and details disclosed herein can be applied to other devices or systems, including, but not limited to, package labels, other shipping labels, other identification tags or items and/or the like.

Figure 1:
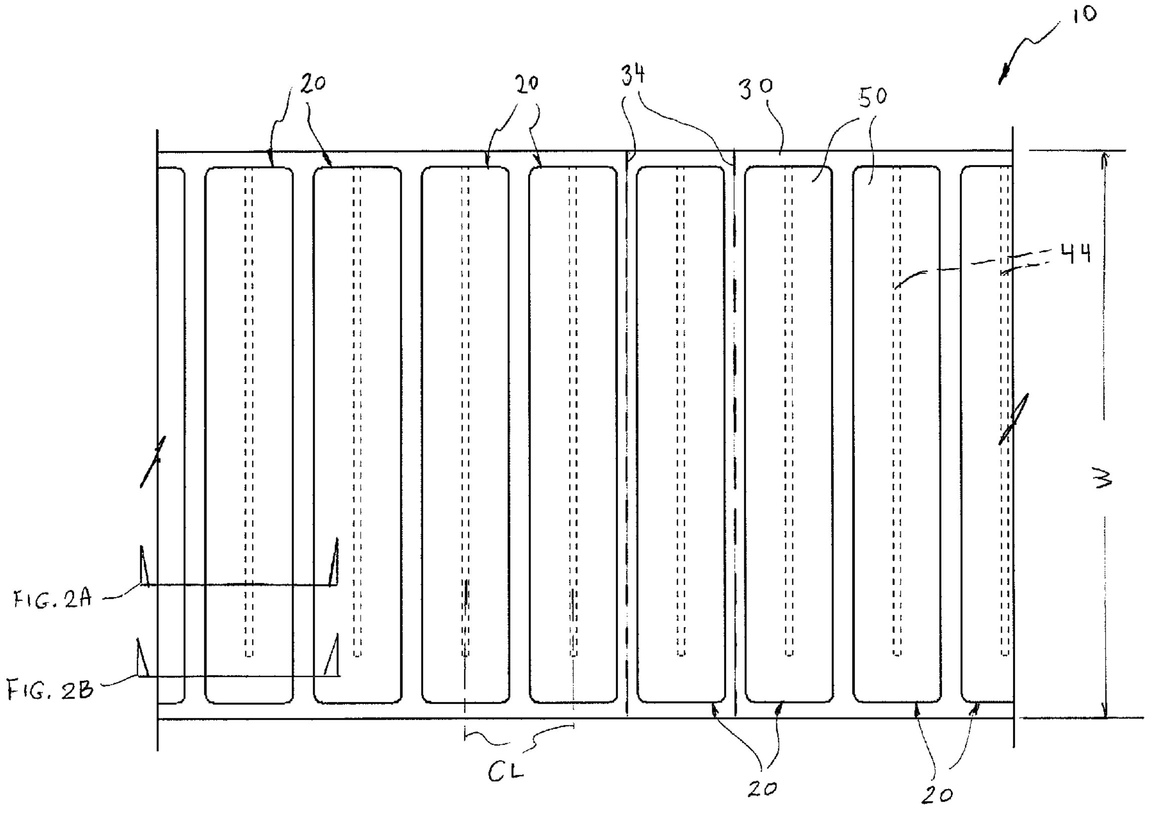
FIG. 1 illustrates a top view of a portion of a roll which is configured to be fed into a printed and which comprises a plurality of foldable labels according to one embodiment.

FIG. 1 illustrates a partial top view of a roll 10 comprising a plurality of printable labels 20. The roll 10 can be fed through a printer, plotter or other printing device for selectively printing or otherwise including identifying information (e.g., text, graphics, barcodes, etc.) thereon. In other embodiments, in lieu of being on a roll 10, the labels 20 are included on a sheet or other individual member that can be selectively fed into a printer or other printing device.

As discussed in greater detail herein, the roll 10 can comprise a printable top layer 50 on which text, graphics and/or the like can be selectively printed. In the illustrated embodiment, each label 20 generally extends almost across the entire width W of the roll 10. However, the size, shape, position relative to the roll, spacing and/or other details regarding the labels 20 can vary, as desired or required. Further, as shown in FIG. 1, each label 20 can advantageously include a folding crease 44 (e.g., located below the printable layer 50) and/or other feature (e.g., perforations, scoring, etc.) in order to permit a user to easily and accurately fold, bend or otherwise shape the label 20. For example, in some embodiments, the crease 44 is positioned at or near a longitudinal centerline CL of the label 20 to ensure that the label 20 is accurately folded in half. A label 20 can comprise one or more other folding creases 44, either in lieu of or in addition to a centerline crease 44 so that it can be accurately folded, bent, shaped or otherwise manipulated in a desired manner after printing.

According to certain embodiments, the folding creases 44 extend partially or completely across a label 20. For instance, in the embodiment illustrated in FIG. 1, each crease 44 begins at or near the edge of a label 20 but does not extend completely across to the opposite edge of the label 20. In some arrangements, a crease that only partially extends through a label 20, such as those depicted in FIG. 1, is nevertheless configured to permit a user to accurately and easily fold the label 20 in a preferred manner (e.g., along the centerline CL).

In some arrangements, text, other characters, graphics, patterns, barcodes, color schemes and/or the like can be selectively printed on any of the foldable labels disclosed herein, or equivalents thereof. For example, when the labels are adapted for placement on folders, a name, title, address, code and/or other identification information can be printed on the label, as desired or required. Such folders can be used in a variety of industries or businesses, including, without limitation, medical or dental offices, hospitals, clinics or other healthcare facilities, law firms, accounting offices, retail or wholesale businesses and the like. In other arrangements, labels adapted to be affixed on the outside of parcels, boxes, containers and/or other items configured to be shipped can include the name of the intended recipient and/or sender, the destination address, the origin address, other contact information, a tracking number, a barcode and/or any other desired or required information.

Figure 2A:
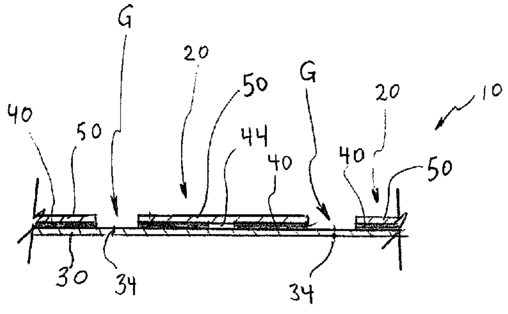
FIG. 2A illustrates a cross-sectional view taken through a first portion of the roll of FIG. 1.

FIG. 2A illustrates a cross-sectional view of the label 20 of FIG. 1. As shown, the cross-section is taken through a portion of a label 20 that includes a folding crease 44 extending through or near its longitudinal centerline CL. The label roll 10 can include a liner 30 (e.g., backing, base layer, quick release paper, etc.), an intermediate layer 40 and a top or printable layer 50. In other arrangements, the label roll 10 includes more or fewer layers, as desired or required.

According to certain arrangements, the liner or base layer 30 comprises waxed paper, another type of quick-release paper, one or more polymeric coatings or surfaces and/or other materials that can facilitate removal of one or more adhesive layers therefrom. In certain embodiments, the liner 30 is at least partially translucent or transparent in order to permit an photo eye, optical sensor and/or other component of a printer to detect the light absorption/deflection properties of the layers situated adjacent to the liner 30 (e.g., intermediate or contrasting layer 40). Consequently, information obtained by such an optical sensor can help determine the "top-of-form" or the location of the subsequent label 20 in the label roll 10 being fed through the printer.

With continued reference to the cross-sectional view of FIG. 2A, each label 20 can additionally comprise an intermediate or contrasting layer 40 that is secured to the liner 30 using one or more adhesives. In some arrangements, the intermediate layer 40 includes one or more adhesive surfaces that are configured to be selectively peeled away or removed from the adjacent liner 30. The intermediate layer 40 can comprise paper, film, fabric, foil, polymeric materials and/or the like. According to certain embodiments, the intermediate layer 40 is black, grey, blue or another dark color that provides the necessary contrast for an optical detector of a printer to determine the location of the gaps G between adjacent labels 20 (e.g., the "top-of-form"). Thus, a printer receiving such a label roll 10 can accurately advance the roll 10 to the next available label 20. This can advantageously permit one or more individual labels to be printed using a continuous label roll 10. Thus, the number of unused labels typically included on a label sheet can be reduced or eliminated.

In FIG. 2A, a folding crease 44 is located at or near the middle of the intermediate layer 40 of the label 20. As discussed, such a crease 44 can facilitate the folding, bending or otherwise manipulating a label 20 in a desired manner (e.g., in half, along a longitudinal centerline CL, etc.) in advance of affixing the label 20 to an item (e.g., an edge of a folder, box, parcel, container and/or the like). In the depicted embodiment, the crease 44 is formed by eliminating a portion of the intermediate layer 40. However, in other embodiments, other methods for producing one or more folding creases 44 are used, either in lieu of or in addition to creating a gap in the intermediate layer 40. For example, a folding crease 44 can comprise a scored, cut, perforated or otherwise undermined portion of the intermediate layer 40 and/or other layer of a label 20. In other embodiments, the folding crease 44 comprises a different material and/or different physical properties than adjacent portions of the label 20. This can create a weakened line, plane or other region along which the label can be easily folded.

According to some arrangements, as illustrated in FIG. 2A, the labels 20 include one or more upper layers. In the depicted embodiment, a printable layer 50 is adhered to the top surface of the intermediate or contrasting layer 40. Such a printable layer 50 can include one or more different materials, such as, for example, paper, film, fabric, plastic or other polymeric material, thermal stock and/or the like.

According to certain arrangements, the intermediate layer 40 can be dark (e.g., black, gray, blue, red, etc.) or have light reflecting/absorbing properties that are different than the adjacent liner 30. As discussed in greater detail herein, this can advantageously permit an optical detector or other sensor of a printer through which a label roll 10 is fed to determine the "top-of-form" or the beginning of the next available label 20 to be printed.

Figure 2B:
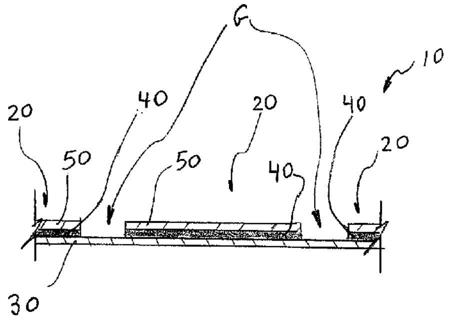
FIG. 2B illustrates a cross-sectional view taken through a second portion of the roll of FIG. 1.

FIG. 2B illustrates another cross-sectional view of a label 20 situated on the roll of FIG. 1. This cross-section is taken along a portion that is closer to the edge of the label 20. As shown, the folding crease 44 does not extend through the portion of the label 20 depicted in FIG. 2B. The significance of such a configuration in determining the "top-of-form" is discussed in greater detail herein.

As illustrated in FIGS. 1 and 2A, any embodiments of the liner 30 and/or other portion of the roll 10 disclosed herein, or equivalents thereof, can include perforations 34 or similar features that enable a user to easily separate one or more labels from roll 10. For example, such perforations 34 can facilitate removal of the labels 20 after the necessary text, graphics and/or other information have been printed thereon.

Figure 2C:
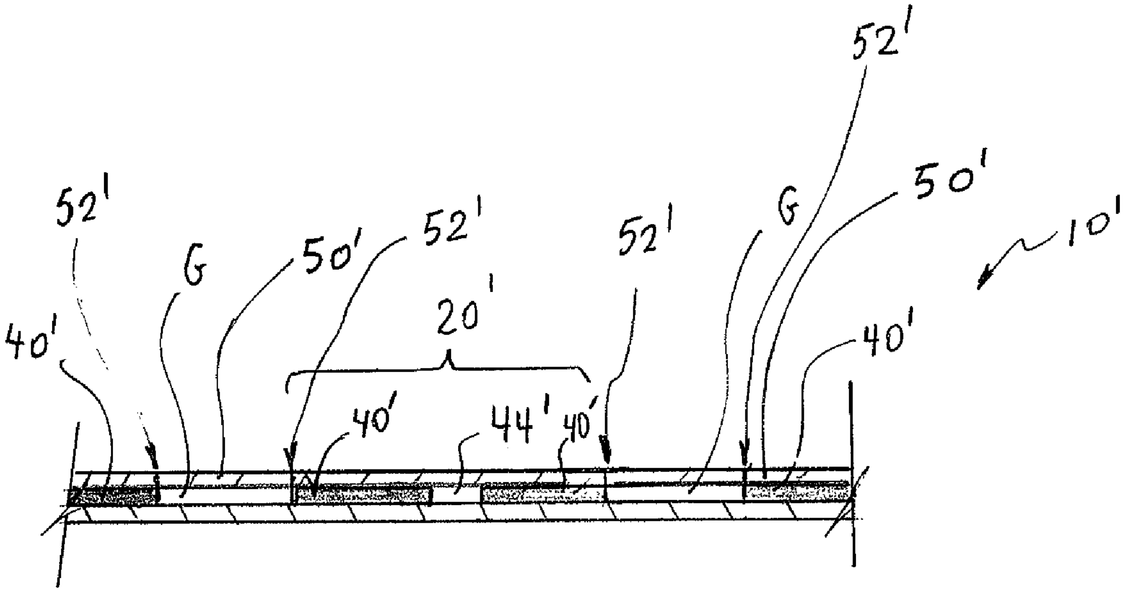
FIG. 2C illustrates a cross-sectional view taken through another embodiment of a label roll.

In other embodiments, as illustrated by the cross sectional view of FIG. 2C, the printable layer 50' is generally continuous along the entire length of the label roll 10'. In other words, in contrast to the roll 10 of FIGS. 1, 2A and 2B, the printable layer 50' of FIG. 2C extends between adjacent labels 20'. As part of the manufacturing process, the printable layer 50' can be sliced, perforated, scored and/or otherwise compromised along the edges of each label 20'. Accordingly, as illustrated in FIG. 2C and discussed in greater detail herein, the periphery of each label 20' can include a continuous or discontinuous cut 52' to assist a user in separating the label 20' from the liner 30' after the label 20' has been printed.

Figure 3:
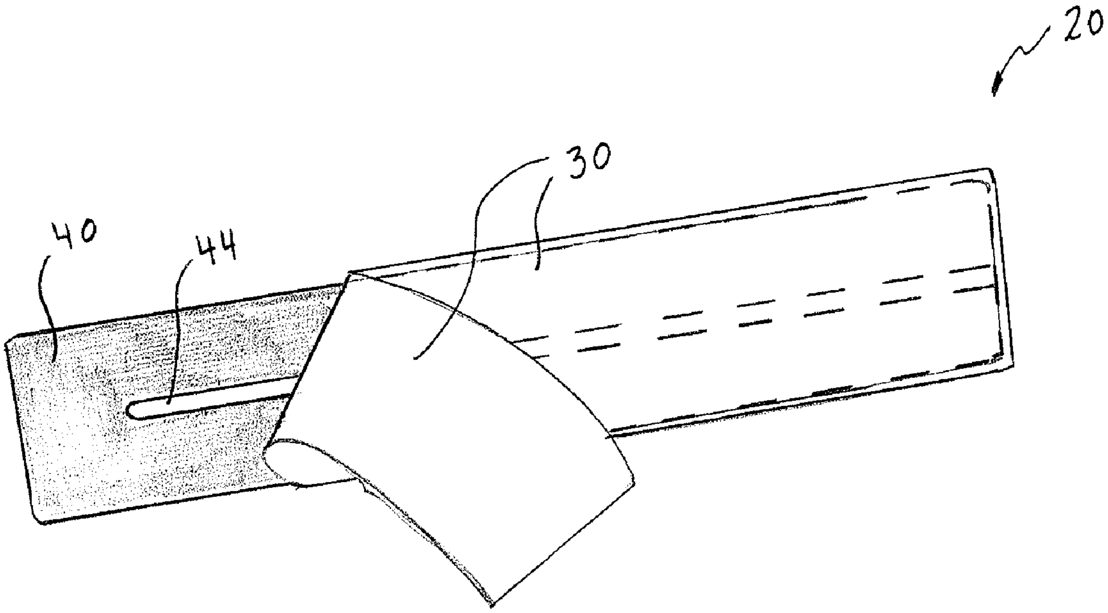
FIG. 3 illustrates a perspective view of a foldable label according to one embodiment with a portion of the liner peeled away from the rest of the label.

FIG. 3 illustrates a rear perspective view of label 20 that has been detached from a label roll 10 (FIG. 1). In the depicted embodiment, a portion of the liner 30 has been separated from the rest of the label 20, revealing the adjacent intermediate layer 40 and the folding crease 44 formed therein. As discussed, the bottom of the intermediate layer 40 can include adhesives that enable a user to easily affix the label 20 on a desired item. Further, the liner 30 can comprise waxed paper, quick release paper and/or other coatings or materials that permit it to be easily attached to or removed from adjacent adhesive layers or surfaces of the label 20.

Figure 4:
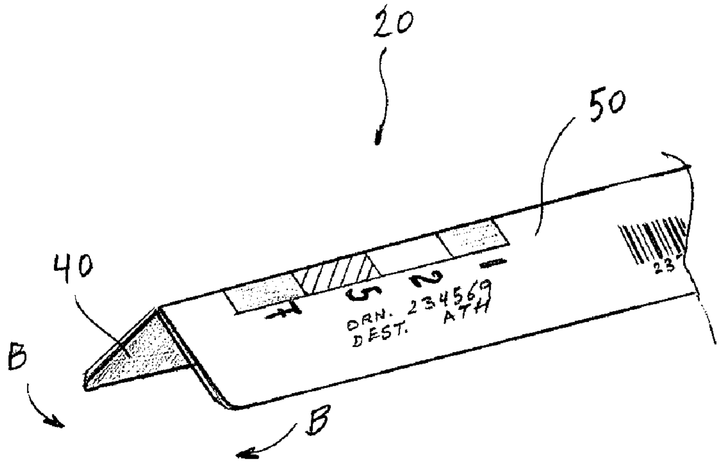
FIG. 4 illustrates a perspective view of a label at least partially folded or bent according to one embodiment.

With reference to FIG. 4, once the liner 30 has been removed, the label 20 can be easily folded along the folding crease (not shown) in a direction generally represented by arrows B. The crease can help ensure that the label 20 is properly folded in a desired manner (e.g., along or near the longitudinal centerline of the label 20). As shown in FIG. 4, text, graphics, barcodes, combinations thereof and/or the like can be printed on the printable layer 50 of the label 20, as desired or required. Depending on the item to which it will be affixed, the label 20 can be folded approximately 90 degrees, 180 degrees or any other angle or orientation.

Figure 5:
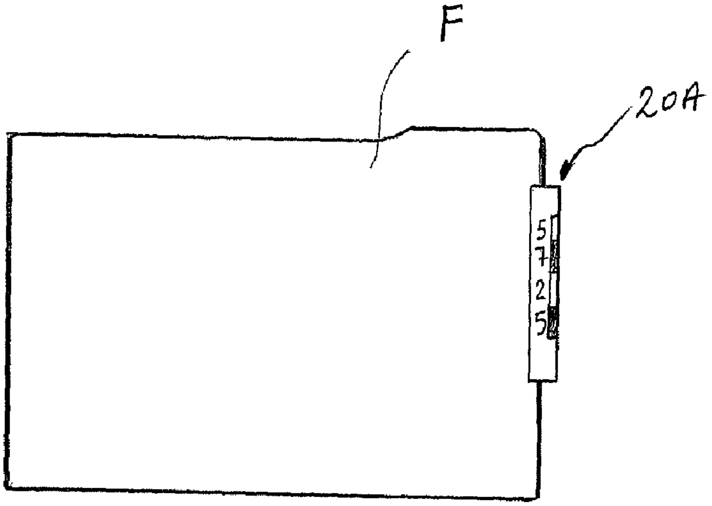
FIG. 5 illustrates a side view of one embodiment of a foldable label positioned along an edge of a folder.

FIG. 5 illustrates a printed label in accordance with the various embodiments disclosed herein secured to the edge of a file F. Such a file F can be one maintained by a doctor's office, hospital or other medical facility. Alternatively, the file F can be used by any other individual, business, organization or other entity for proper recordkeeping. According to certain embodiments, the labels 20A are configured to be secured along the edges or other sides of such files F. This can help ensure that employees or other users of such files F are able to easily locate, remove and replace them during the course of their duties.

Figure 6:
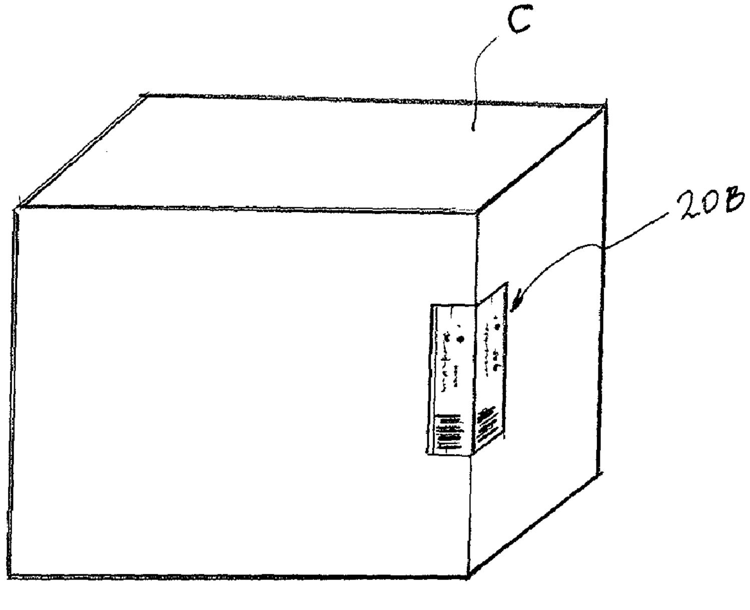
FIG. 6 illustrates a perspective view of one embodiment of a foldable label affixed along an edge of a box or other container.

Alternatively, printed labels can be placed on a box, parcel, other container C and/or any other item. For example, the labels can comprise shipping labels which include names, addresses, tracking numbers, barcodes and/or the like to assist in the transport, sorting and other tasks related to the delivery of such items. As illustrated in FIG. 6, a label 20B can be folded and affixed along one of the edges of a container C so that the printed data and/or other information provided on the label 20B can be conveniently read from at two different directions. This can be particularly helpful because such containers C are typically stacked prior to or during transit.

As discussed, a label roll can be sized, shaped and otherwise configured to be fed into a printer which is specifically designed to receive and print labels. In addition, such a printer can be advantageously adapted to detect the gaps between adjacent labels on such a roll. For example, the printer can include a photo eye, an optical sensor or other detector to accurately determine the "top-of-form" or the beginning on the next label on the roll to be printed. In some embodiments, an adequate label printer includes Primera Technology, Inc.'s Model LX800 or LX810. However, the label rolls disclosed herein, or variations thereof, can be fed into any other printer, plotter or other similar device.

Figure 7B:
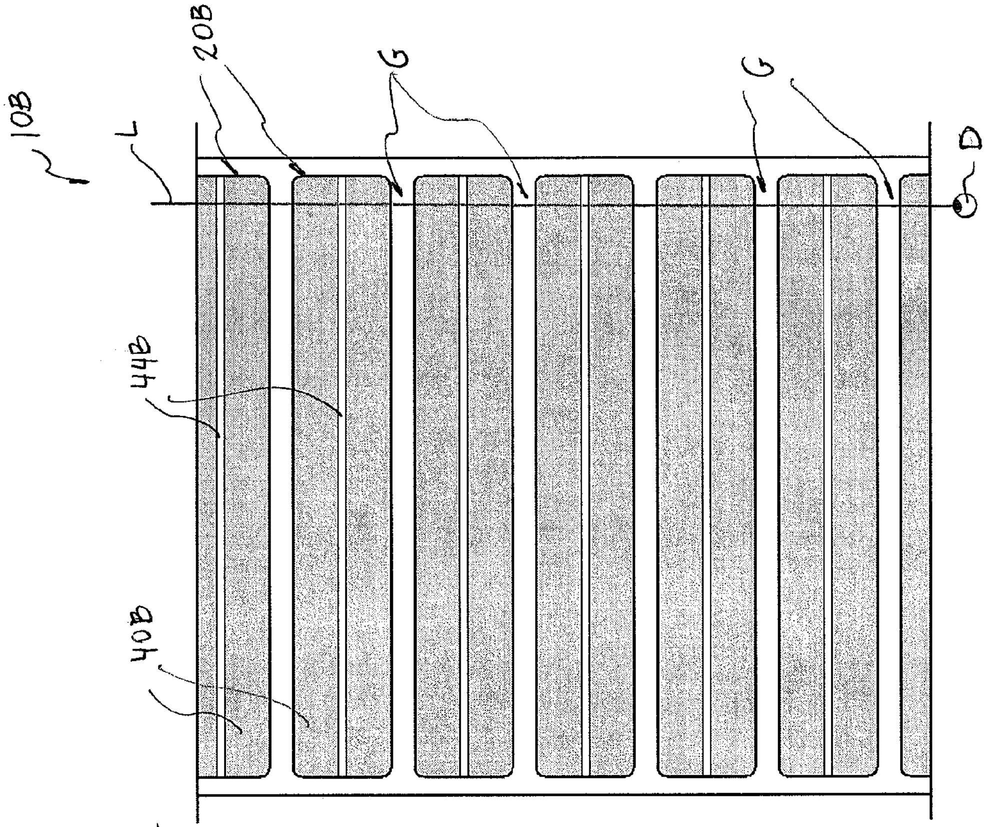
FIG. 7B illustrates another embodiment of a portion of a label roll comprising a plurality of foldable labels in relation to an optical detector of a printer.
Figure 7A:
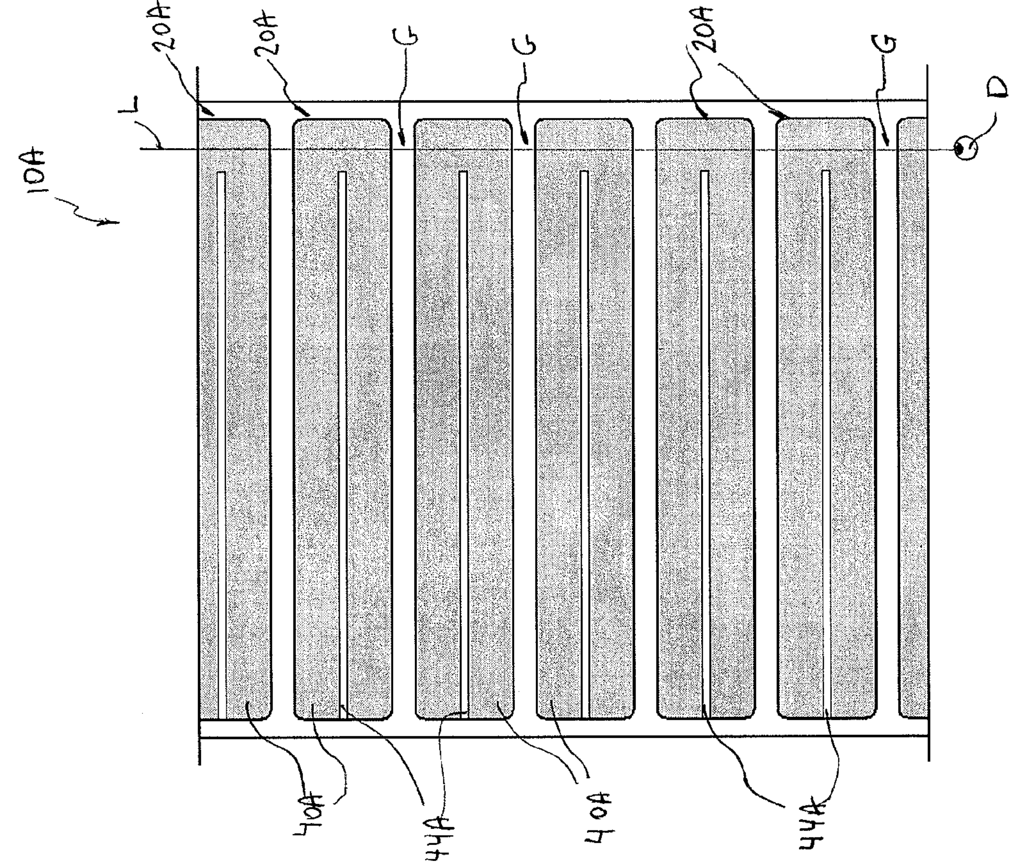
FIG. 7A illustrates an embodiment of a portion of a label roll comprising a plurality of foldable labels in relation to an optical detector of a printer.

As illustrated in FIGS. 7A and 7B, the photo eye or other optical detector D of a printer can be located along or near an edge of a label roll 10A, 10B. In the depicted arrangements, the detector D is positioned along the right end of the respective label 10A, 10B. Alternatively, the location of the photo eye D or other detector relative to the label roll can be different than illustrated and discussed herein. For example, the detector D can be positioned along the opposite side of the roll (e.g., aligned with or positioned near the left edge of each label 20A, 20B). In other embodiments, the detector D of the printer is generally located at or near the middle of the label roll 10C (see FIG. 7C). Further, the location of the photo eye, optical detector or other sensor can be selectively varied by a user, as desired or required. By way of example, the position of a printer's optical detector D can be manually or automatically adjusted based on the width, other dimension, shape, type, location of the label folding crease and/or other characteristics of the label roll being fed through a printer.

Figure 7C:
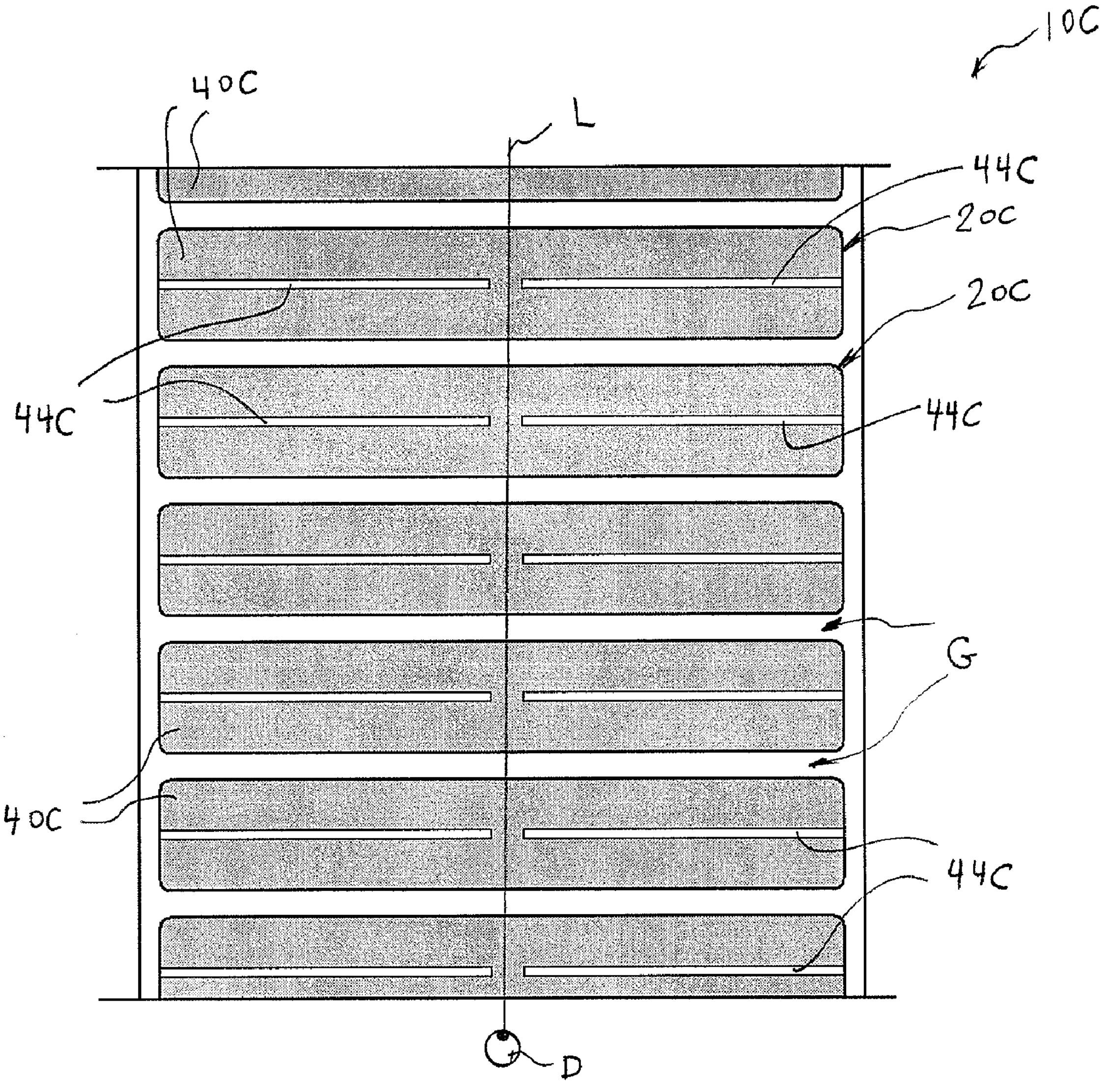
FIG. 7C illustrates still another embodiment of a portion of a label roll comprising a plurality of foldable labels in relation to an optical detector of a printer.

In some embodiments, the optical detector D or other sensor is configured to be positioned below the roll 10A, 10B, 10C being fed through the printer. Accordingly, the optical detector D can be adjacent to the liner or other bottom-most layer of the label roll. FIGS. 7A-7C illustrate the lower surfaces of the label rolls 10A, 10B, 10C as would be seen from the perspective of the printer's optical detector. For clarity, the liner and/or other bottom layer of the roll 10A, 10B, 10C (e.g., below the intermediate or contrasting layer 40A, 40B, 40C) have been omitted in FIGS. 7A-7C for clarity. However, in some embodiments, such liners and/or other layers positioned below the labels 20A, 20B, 20C are advantageously configured to be at least partially translucent, transparent or otherwise configured to permit an optical sensor of the printer to detect the intermediate layer 40A, 40B, 40C therethrough. Thus, as described in greater detail herein, the "top-of-form" or the location of the subsequent label 20A, 20B, 20C in the roll 10A, 10B, 10C to be printed can be easily and accurately determined.

With continued reference to FIGS. 7A and 7B, the labels 20A, 20B can include one or more folding creases 44A, 44B. In the illustrated arrangements, each label 20A, 20B includes a single folding crease 44A, 44B that is situated along or near the longitudinal centerline of the label 20A, 20B. As discussed in greater detail herein with reference to FIG. 1, such a crease can be formed by eliminating one or more layers and/or other portions of the label 20A, 20B, such as, for example, the intermediate or contrasting layer 40A, 40B. Alternatively, the crease 44A, 44B or other feature configured to assist a user in folding, bending or otherwise manipulating the shape of a printed label 20A, 20B in a desired manner can be created using scoring, perforations, other cuts or forms of undermining one or more portions of the and/or the like. Regardless of the exact features or methods used, the labels 20A, 20B can be adapted to only be selectively folded along one or more lines or planes (e.g., at or near the longitudinal centerline of a label).

As discussed with reference to FIG. 1, the folding crease can extend either continuously or intermittently (e.g., partially) through a label. For instance, in the roll of FIG. 7A, the crease 44A extends to the left-most end, but not to the right-most end of each label 20A. Such a design can help the optical detector D (or other sensor of the printer through which the label roll 10A is fed) to accurately determine the "top-of-form" or gap between adjacent labels 20A. In the embodiments illustrated in FIGS. 7A-7C, as a roll is advanced through the printer, the optical detector D or other sensor is configured to detect differences in the light absorbing/reflecting properties of the labels 20A, 20B, 20C generally along line L. Accordingly, in FIG. 7A, the only differences in such properties that will be perceived by the detector D will occur at the gaps G between adjacent labels 20A. Thus, by recognizing the exact location of such gaps G, the printer can accurately determine the "top-of-form" in preparation for one or more labels 20A.

In contrast, the labels 20B of FIG. 7B comprise folding creases 44B that generally extend across the entire width of the respective labels 20B. Thus, a printer's optical detector D or other sensor may be configured to pass over both the gaps G between adjacent labels 20B and the folding crease 44B of each label 20B. Consequently, it may be difficult or impossible for the optical detector D to accurately distinguish between the inter-label gaps G and the creases 44B. Accordingly, such a label design can prevent a printer from properly detecting the "top-of-form" in a roll 10B.

In other embodiments, as illustrated in FIG. 7C, a discontinuity in the folding crease 44C is positioned at or near the middle of each label 20C. In such arrangements, the photo eye D, optical detector or other sensor can be advantageously aligned with a line L that generally passes through the discontinuity of each label's folding crease 44C. Therefore, the printer can accurately and reliably locate the gaps between adjacent labels 20C in the roll 10C (e.g., the "top-of-form"). As discussed with reference to other embodiments disclosed herein, despite their discontinuous or intermittent nature, the creases 44C can be configured to easily permit a user to fold, bend or otherwise shape a printed label in a desired manner (e.g., along the center of the label). Alternatively, a label can include a discontinuity or similar feature along one or more other portions, as desired or required. Further, in some arrangements, a label printer comprises a movable optical detector D or other sensor so that the "top-of-form" can be accurately detected regardless of the type of labels used. For example, the optical detector D can be manually or automatically repositioned so that it generally aligns with one or more portions of a particular label through which a folding crease or similar feature does not extend.

Figure 8:
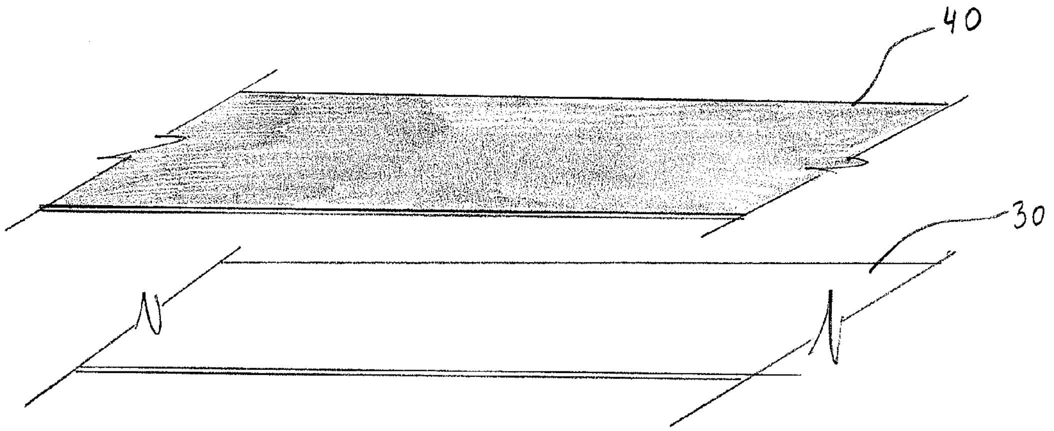
FIG. 8 illustrates a perspective view of a liner or other base layer and an intermediate layer that are configured to adhere to each other for the manufacture of a roll of foldable labels according to one embodiment.
Figure 9:
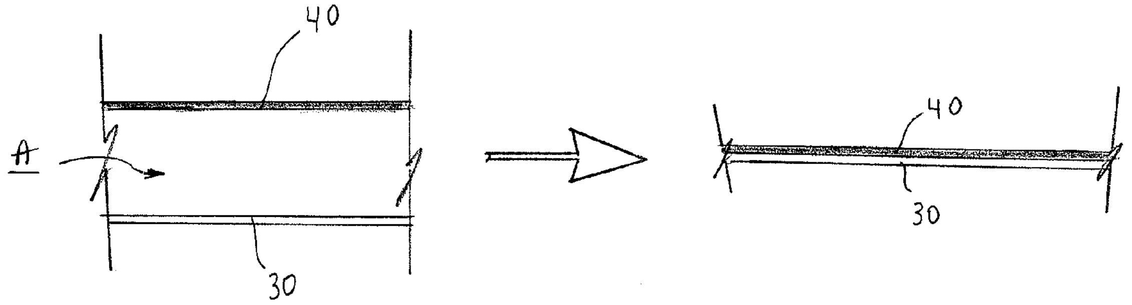
FIG. 9 illustrates time-sequential side views of the base layer and the intermediate layer of FIG. 8.

Various details and other information related to the manufacture of the different embodiments of the labels disclosed herein, or variations thereof, are provided with reference to FIGS. 8, 9, 10A-10D and 11A-11D. As depicted in FIGS. 8 and 9, labels comprise a liner 30 and an intermediate layer 40 or contrasting layer attached thereto. As discussed, the liner 30 can comprise waxed paper, another quick release paper or material, a one or more coatings and/or the like. Further, the intermediate layer 40 can include paper, film, fabric, foil, polymeric materials and/or the like. According to some adaptations, the bottom of the intermediate layer 40 comprises one or more adhesive surfaces or portions that are configured to releasably attach to the adjacent surface of the liner 30. Alternatively, one or more glues or other adhesives can be provided between the liner 30 and the intermediate layer 40 prior to joining them together, as shown in FIG. 9.

Figure 10A:
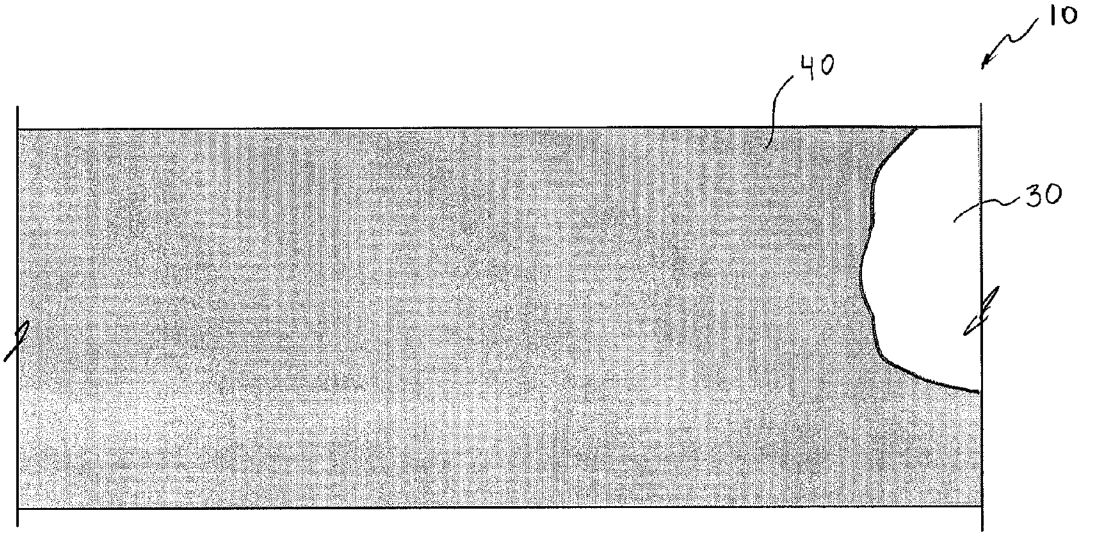
FIG. 10A illustrates a top view of the liner and the intermediate layer of FIGS. 8 and 9 with a portion of the intermediate layer removed to reveal the liner situated therebelow according to one embodiment.
Figure 10B:
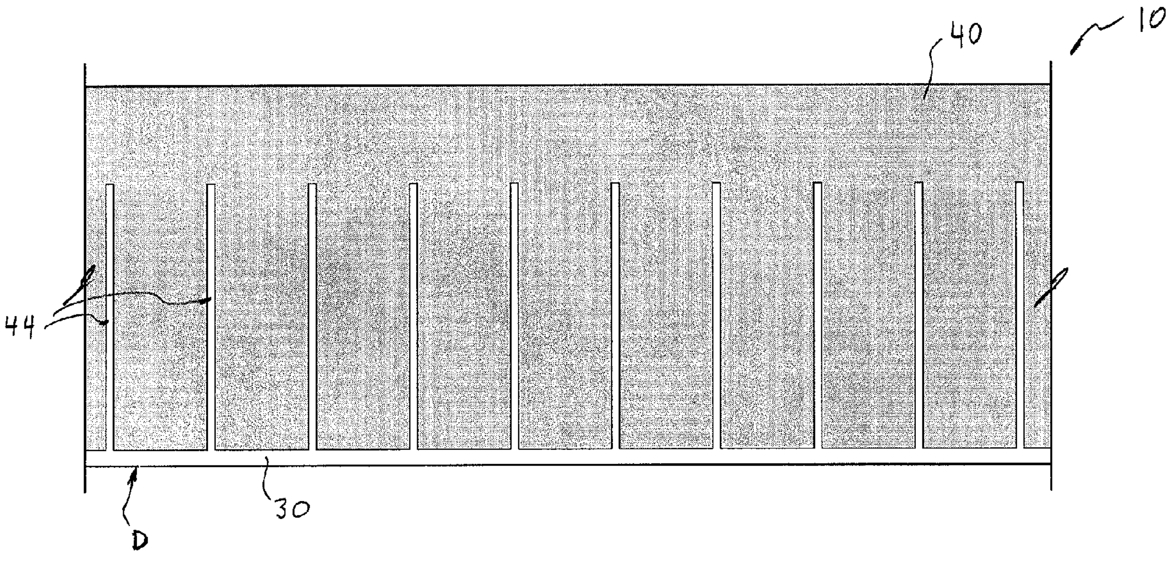
FIG. 10B illustrates a top view of the liner and the intermediate layer of FIG. 10A with portions of the intermediate layer removed to form a plurality of folding creases.

FIG. 10A illustrates a top view of the intermediate layer 40 and the liner 30 of FIGS. 8 and 9. In the depicted embodiment, a portion of the intermediate layer 40 is hidden to reveal the underlying liner 30. Once the intermediate layer 40 has been properly secured to the liner 30, the roll 10 can be directed through a die-cut machine or similar device that is configured to selectively cut and remove portions of the intermediate layer 40. With reference to the embodiment of FIG. 10B, at least some of the removed portions of the intermediate layer 40 can form the folding creases 44 of the labels as a result of this die-cut phase. In order to facilitate the formation of the folding creases 44 within the label roll 10, the areas of the intermediate layer 40 that are removed can comprise a unitary, continuous piece. Thus, the removed portions of the intermediate layer 40 can be easily peeled away from the adjacent liner 30 and discarded as the roll 10 is fed through or past a die-cut machine or other device.

Figure 10C:
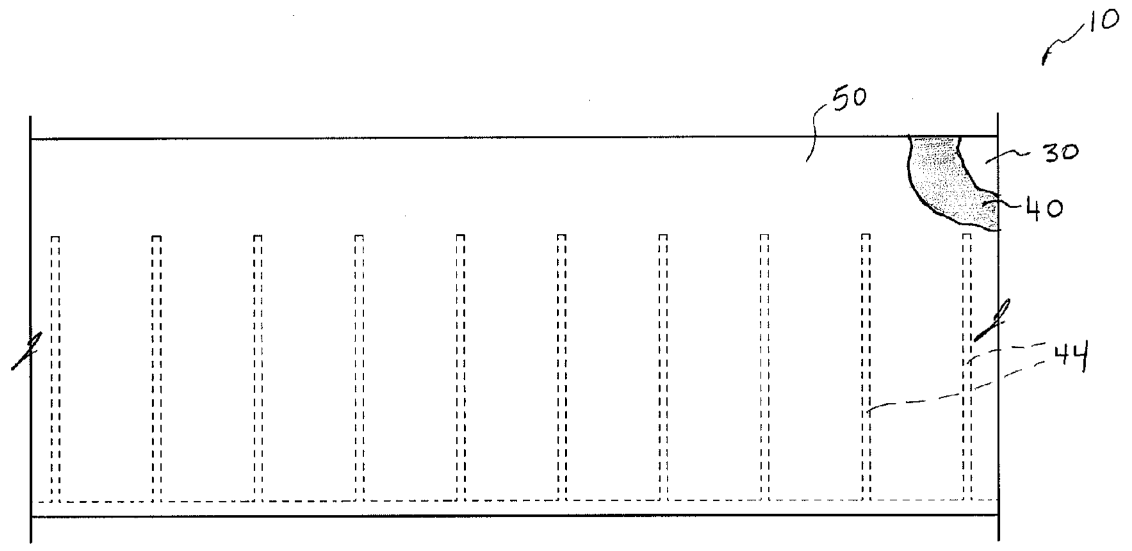
FIG. 10C illustrates a top view of a printable layer affixed on top of the intermediate layer and liner of FIGS. 10A and 10B.

According to certain embodiments, once the desired portions of the intermediate layer 40 have been removed (e.g., in order to form what will become the folding creases of the labels), a printable layer 50 can be added to the label roll 10. As illustrated in FIG. 10C, the printable layer 50 can be affixed to the intermediate layer 40. Further, the roll 10 can include one or more additional layers, as desired or required. In FIG. 10C, the folding creases 44 are shown with dashed lines, as they are positioned below the printable layer 50.

Figure 10D:
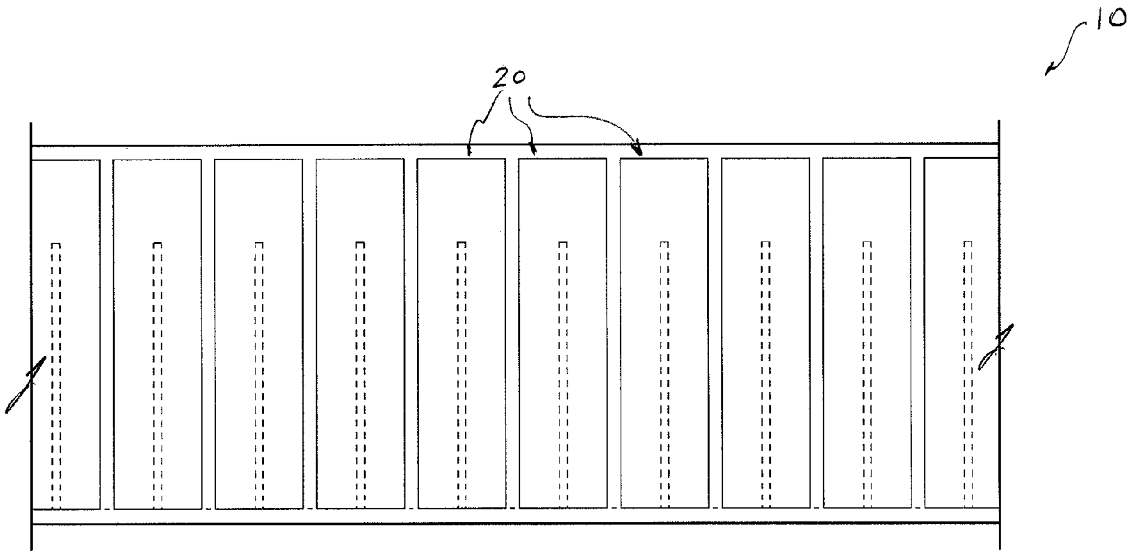
FIG. 10D illustrates the label roll of FIG. 10C with a plurality of labels formed thereon following a die cut step according to one embodiment.

In some arrangements, the manufacture of the label roll 10 further comprises subsequently directing the roll 10 through another die-cut machine or other device. Accordingly, as shown in FIG. 10D, a plurality of distinct labels 20 can be formed on the roll 10. For example, a "kiss cut" can be used to die cut the printable layer 50 and the intermediate layer 40, but not the liner 30 positioned therebelow. The location of the kiss cut or other method used to form the individual labels 20 can be advantageously selected based, at least in part, on the relative position of the folding creases 44. This can help ensure that the labels 20 can be folded, bent or otherwise shaped as desired or required after printing (e.g., along or near their longitudinal centerline).

Figure 11A:
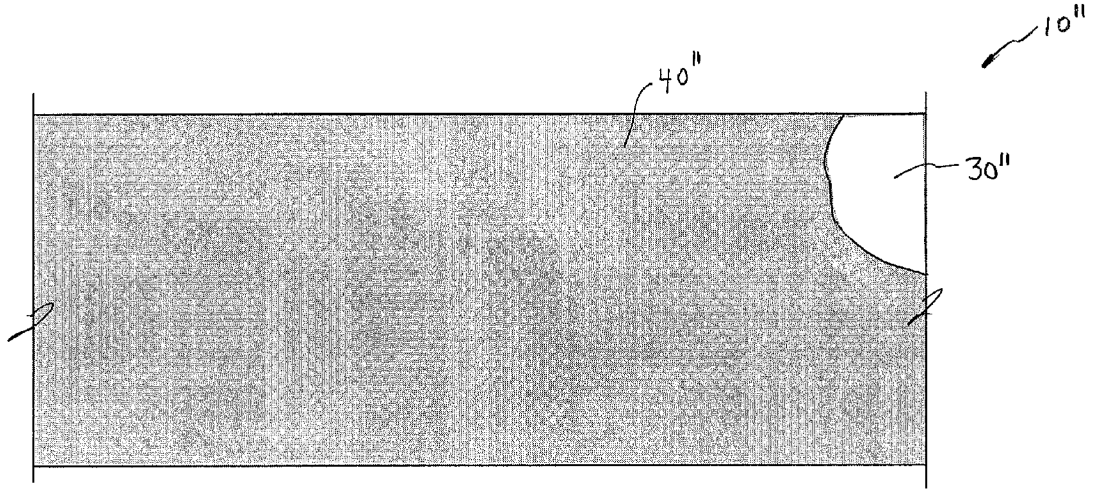
FIG. 11A illustrates a top view of a liner and an intermediate layer affixed thereto with a portion of the intermediate layer removed to reveal the liner situated therebelow according to another embodiment.
Figure 11B:
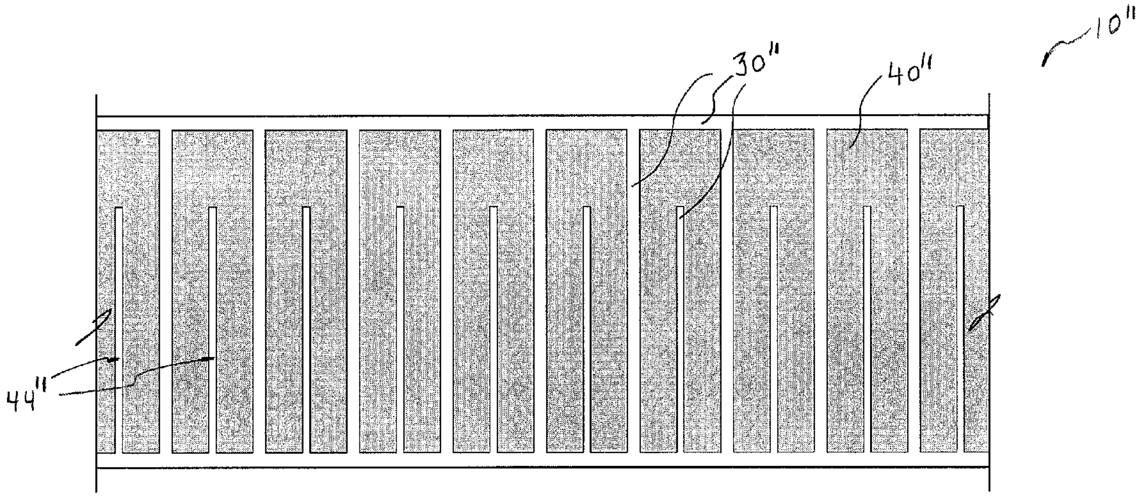
FIG. 11B illustrates a top view of the liner and the intermediate layer of FIG. 11A with portions of the intermediate layer removed to form a plurality of folding creases.
Figure 11C:
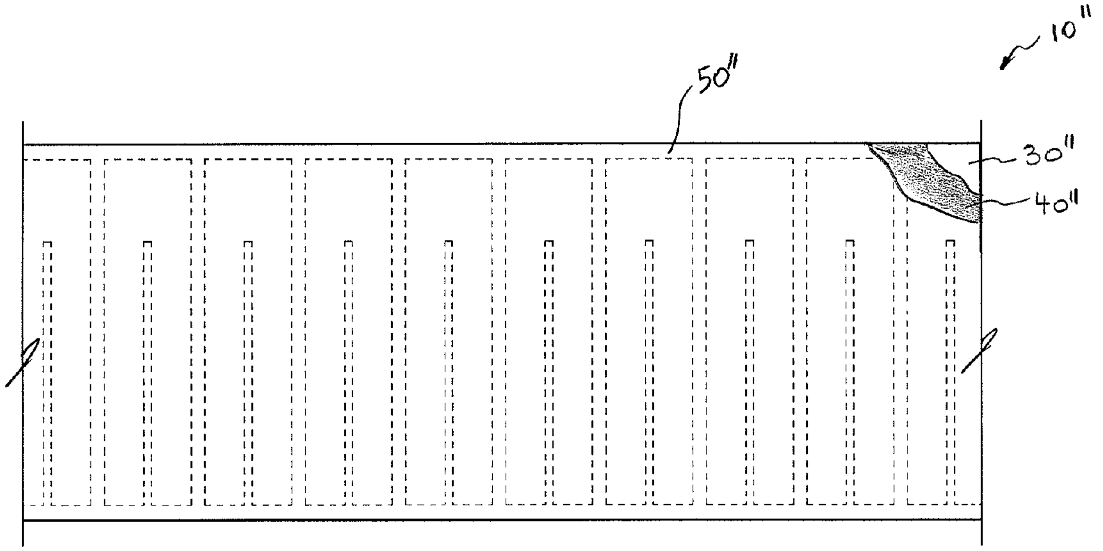
FIG. 11C illustrates a top view of a printable layer affixed on top of the intermediate layer and liner of FIGS. 11A and 11B.
Figure 11D:
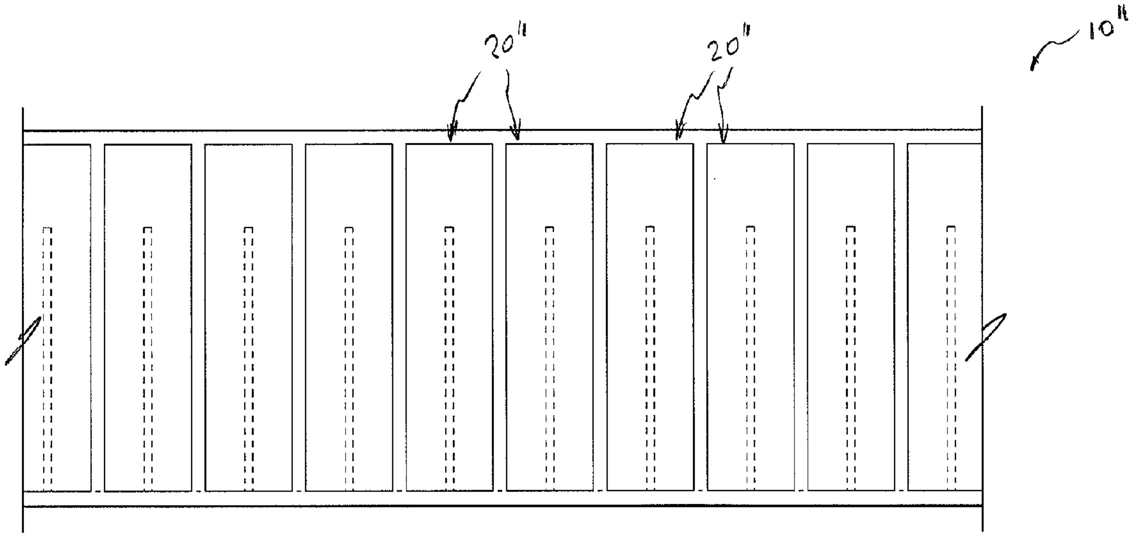
FIG. 11D illustrates the label roll of FIG. 11C with a plurality of labels formed thereon following a die cut step according to one embodiment.

An embodiment of another time-sequential series of steps used to make a roll 10' comprising a plurality of foldable labels 20" is illustrated in FIGS. 11A-11D. With a few differences, this alternative method is similar to the one discussed with reference to FIGS. 10A-10D. For example, as illustrated in FIG. 11B, the entire area of the intermediate layer 40" that will not be included in the finalized labels 20" (FIG. 11D) can be removed. Thus, instead of removing the portions of the intermediate layer 40 between adjacent labels 20 after the printable layer 50 has been affixed to the label roll 10 (as in the embodiment of FIGS. 10A-10D), these portions of the intermediate layer 40" can be eliminated during an earlier manufacturing step. Consequently, a die cut machine or other similar cutting device can be configured to only "kiss cut" or otherwise slice through the printable layer 50" (and any other layers positioned above the intermediate layer 40") of the roll 10" during the final step illustrated in FIG. 11D. Although certain embodiments of manufacturing a roll comprising a plurality of foldable labels have been disclosed herein, one or more different methods can be used.

The articles, devices, assemblies, systems and/or other items disclosed herein may be formed through any suitable means. The various methods and techniques described above provide a number of ways to carry out the invention. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as may be taught or suggested herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the embodiments of the inventions.

Although the inventions have been disclosed in the context of certain embodiments and examples, it will be understood by those skilled in the art that the inventions extend beyond the specifically disclosed embodiments to other alternative embodiments and/or uses and obvious modifications and equivalents thereof. Accordingly, it is not intended that the inventions be limited to the specific embodiments disclosed herein.

What is claimed is:

1. An adhesive label, comprising:

a top layer comprising an upper surface adapted to be printed and a bottom surface generally opposite of said upper surface;

an intermediate layer comprising a top surface and a lower surface; said top surface of the intermediate layer secured to the bottom surface of the top layer;

at least one crease within the intermediate layer;

a liner configured to releasably attach to the lower surface of the intermediate layer;

wherein the least one crease is configured to facilitate folding of the label in a desired manner;

wherein the at least one crease does not extend through the top layer; and wherein the printable layer is generally continuous.

2. The label of claim 1, wherein the at least one crease comprises a gap in the intermediate layer.

3. An adhesive label configured to be fed into a printer, comprising:

a printable layer comprising a first side adapted to be printed and a second side generally opposite of said first side;

an intermediate layer comprising a top side and a bottom side; said top side of said intermediate layer secured to the second side of the printable layer, wherein said intermediate layer comprises at least one crease;

a liner configured to releasably attach to the bottom side of the intermediate layer;

wherein the at least one crease is configured to facilitate folding of the label in a desired manner;

wherein the at least one crease does not extend across an entire width of the label; and wherein the at least one crease does not extend through the printable layer, such that said printable layer is generally continuous.

4. The label of claim 3, wherein the at least one crease comprises a gap in the intermediate layer.

5. The label of claim 3, wherein the liner comprises a waxed paper.

6. The label of claim 3, further comprising an adhesive between the intermediate layer and the liner.

7. The label of claim 3, wherein the at least one crease extends from the top side to the bottom side of said intermediate layer.

8. An adhesive label configured to be fed into a printer, comprising:

an upper layer having a top surface and a bottom surface, said top surface of said upper layer configured be selectively printed;

a liner;

an intermediate layer generally positioned between the upper layer and the liner;

at least a first adhesive placed between the liner and the intermediate layer;

at least a second adhesive placed between the upper layer and the intermediate layer to secure the printable layer to the intermediate layer;

wherein the liner is configured to releasably attach to the intermediate layer; and wherein said label comprises a first end and a second end, said second end being generally opposite said first end, a first distance separating the first end and the second end; and a longitudinal axis extending through the label from the first end to the second end;

wherein the intermediate layer comprises at least one folding crease configured to facilitate folding of the label in a desired manner, a total length of said folding crease having a second distance;

wherein the first distance is greater than the second distance; and wherein the at least one folding crease does not extend through the upper layer, such that the upper layer is generally continuous along a vicinity of the at least one folding crease.

9. The label of claim 8, wherein the at least one crease comprises a gap, a cut, a perforation or a scoring.

10. The label of claim 8, wherein the liner comprises a waxed paper.

11. A label roll comprising a plurality of adhesive labels, said label roll adapted to be fed into a printer, the label roll comprising:

a printable layer having a top surface and a bottom surface, said top surface of said printable layer configured be selectively printed;

a liner;

an intermediate layer generally positioned between the upper layer and the liner;

at least a first adhesive placed between the liner and the intermediate layer; and at least a second adhesive placed between the printable layer and the intermediate layer to secure the printable layer to the intermediate layer;

wherein the liner is configured to releasably attach to the intermediate layer; and wherein said each of said plurality of labels comprises a first end and a second end, said second end being generally opposite said first end, a first distance separating the first end and the second end;

a longitudinal axis extending through each label from the first end to the second end;

wherein the intermediate layer comprises at least one crease configured to facilitate folding of each label in a desired manner, a total length of said crease having a second distance;

wherein the first distance is greater than the second distance; and wherein the at least one crease does not extend through the upper layer, such that the upper layer is generally continuous along a vicinity of the at least one crease.

12. The label roll of claim 11, wherein the at least one crease comprises a gap in the intermediate layer.

13. The label roll of claim 11, wherein the at least one crease comprises a gap, a cut, a perforation or a scoring in the printable layer.

14. The label roll of claim 11, wherein the liner comprises waxed paper.

* * * * *